(12) United States Patent
Yang et al.

(10) Patent No.: US 10,668,860 B2
(45) Date of Patent: Jun. 2, 2020

(54) CAR RUNNING BOARD AND CAR

(71) Applicant: WINBO-Dongjian Automotive Technology Co., Ltd., Foshan Newcity (CN)

(72) Inventors: Jie Yang, Foshan (CN); Weiting He, Foshan (CN); Tong Dai, Foshan (CN); CHangling Yu, Foshan (CN); Yongbo Chen, Foshan (CN)

(73) Assignee: WINBO-Dongjian Automotive Technology Co., Ltd. (CN)

( * ) Notice: Subject to any disclaimer, the term of this patent is extended or adjusted under 35 U.S.C. 154(b) by 0 days.

(21) Appl. No.: 16/229,869

(22) Filed: Dec. 21, 2018

(65) Prior Publication Data

US 2019/0202362 A1 Jul. 4, 2019

(30) Foreign Application Priority Data

Jan. 3, 2018 (CN) .......................... 2018 1 0013342

(51) Int. Cl.
*B60R 3/00* (2006.01)

(52) U.S. Cl.
CPC .................................. *B60R 3/002* (2013.01)

(58) Field of Classification Search
CPC .................................. B60R 3/002; B60R 3/00
See application file for complete search history.

(56) References Cited

U.S. PATENT DOCUMENTS

| 4,935,638 | A | * | 6/1990 | Straka | B60R 3/00 280/163 |
| 4,943,085 | A | * | 7/1990 | Straka | B60R 3/00 182/92 |
| 6,726,230 | B2 | * | 4/2004 | Weir | B60R 3/002 280/163 |
| 7,461,852 | B2 | * | 12/2008 | Richardson | B60R 3/00 280/163 |
| 7,708,294 | B2 | * | 5/2010 | Demick | B60P 1/43 280/163 |
| 8,382,132 | B2 | * | 2/2013 | Kowalski | B60R 3/002 280/163 |
| 8,926,254 | B2 | * | 1/2015 | Pocobello | A61G 3/061 414/537 |
| 2004/0173987 | A1 | * | 9/2004 | Chapman | B60R 3/002 280/163 |
| 2005/0179226 | A1 | * | 8/2005 | Kolpasky | B60R 3/002 280/163 |
| 2005/0275186 | A1 | * | 12/2005 | Drabant | B60R 3/002 280/163 |

(Continued)

*Primary Examiner* — Hau V Phan
(74) *Attorney, Agent, or Firm* — Lerner, David, Littenberg, Krumholz & Mentlik, LLP

(57) ABSTRACT

The present invention discloses a car running board and car, comprising a first running board body, a second running board body and at least one car installation support; the first running board body is telescopically connected with the second running board body; the car installation support is rigidly connected with the first running board body and/or the second running board body on one end and with the car on the other end. Through the above method, the car running board structure of the present invention can change flexibly and contract to reduce volume during the transport, thus saving both the transport cost and storage space.

9 Claims, 3 Drawing Sheets

(56) References Cited

U.S. PATENT DOCUMENTS

| | | | | |
|---|---|---|---|---|
| 2008/0231013 A1* | 9/2008 | Richardson | ............... | B60R 3/00 |
| | | | | 280/163 |
| 2013/0028693 A1* | 1/2013 | Justak | .................... | B60P 1/435 |
| | | | | 414/480 |
| 2015/0291116 A1* | 10/2015 | Pi | ........................... | B60R 13/04 |
| | | | | 280/164.1 |
| 2015/0307029 A1* | 10/2015 | Glovak | ................... | B60R 3/002 |
| | | | | 280/163 |
| 2017/0166135 A1* | 6/2017 | Baskin | ................... | B60R 3/002 |

* cited by examiner

CAR RUNNING BOARD AND CAR

CROSS-REFERENCE TO RELATED APPLICATIONS

The present application claims priority from Chinese Patent Application No. 201810013342.5, filed Jan. 3, 2018, the disclosure of which is hereby incorporated herein by reference.

TECHNICAL FIELD

The present invention involves car technological field, and particularly, a car running board and car.

BACKGROUND OF THE INVENTION

The quick development of automobile market provided a boom to the automotive parts market. The running board of a car is an accessory installed on car sides, which can, on one side, play a role of assisting driver and passengers in getting in and off the car for improved convenience and comfort, and on the other side, protect the car side skirt from direct impact so as to protect the car body. Besides, the car running boards are affordable to drivers and have become an important component of automotive parts market.

Presently, the common car running board bodies are generally of one rigid integrity made of metal plate or pipe by bending, forming and welding and coated for corrosion resistance. Such are the regular products in large car running board markets. Such products have the defects of single fixed structure, and inflexible and large packing for transport, directly affecting the transport cost, which causes price disadvantage for both manufacturers and purchasers.

SUMMARY OF THE INVENTION

The present invention provides a car running board and car that can solve the existing problems of fixed structure, inflexible and large packing for transport and increase of transport cost.

To solve the above technical problem, the present invention adopts the technical solution as follows: a car running board and car, comprising a first running board body, a second running board body and at least one car installation support; the first running board body is telescopically connected with the second running board body; the car installation support is rigidly connected with the first running board body and/or the second running board body on one end and with the car on the other end.

According to an embodiment of the present invention, said first running board body and said second running board body are provided with corresponding limiting devices for restricting them at the preset stretching and contracting positions.

According to an embodiment of the present invention, said first running board body and said second running board body are connected telescopically by a middle connector;

Wherein, said middle connector is fixedly connected with said first running board body, said middle connector is provided with a slide guide, said second running board body is provided with a sliding rail matching with said slide guide, and thus, said first running board body and said second running board body are telescopically connected through said sliding rail and said slide guide of said middle connector;

Said middle connector and said second running board body are provided with corresponding limiting devices for restricting said first running board body and said second body at the preset stretching and contracting positions.

According to an embodiment of the present invention, said first running board body and said second running board body are provided with antiskid structure on surface.

According to an embodiment of the present invention, said antiskid structure includes a funnel-shaped porous structure.

According to an embodiment of the present invention, said antiskid structure also includes antiskid coating.

According to an embodiment of the present invention, the number of said car installation supports is 4 and they are uniformly distributed on the installation side edge of said first running board body and said second running board body.

According to an embodiment of the present invention, said installation supports are metal molded and welded.

According to an embodiment of the present invention, the surfaces of said first running board body, said second running board body, installation supports and middle connector are all provided with a corrosion resistant layer.

To solve the above technical problem, another technical solution adopted by the present invention is: A car comprising any of the above car running boards.

The beneficial effect of the present invention: Different from the available technology, the present invention provides a car running board, comprising a first running board body, a second running board body and at least one car installation support; the first running board body is telescopically connected with the second running board body; the car installation support is rigidly connected with the first running board body and/or the second running board body on one end and with the car on the other end. Through the above method, the car running board structure of the present invention can change flexibly and contract to reduce volume during the transport, thus saving both the transport cost and storage space.

BRIEF DESCRIPTION OF THE DRAWINGS

To describe the technical solution of the embodiments of the present invention more clearly, the drawings used in the embodiments will be briefly introduced. Obviously, the drawings are only some embodiments of the present invention, and those skilled in the art may obtain other drawings based on these drawings without creative labor.

DETAILED DESCRIPTION

Figure 1:
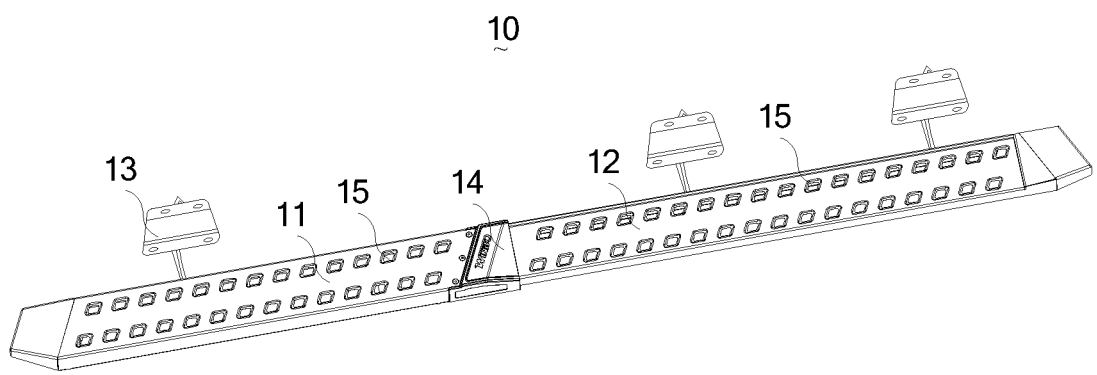
FIG. 1 is the schematic diagram of the front structure in expanded state of the car running board of the present invention.

The technical solution of the embodiments of the present invention is to be described clearly and completely in combination with the drawings. It is understandable that the specific embodiments described herein are intended only to explain the present invention rather than restrict it. It should also be noted that for the convenience of description, only part of the structure related to the present invention is shown in the drawing, rather than the whole structure. All other embodiments obtained by those skilled in the art based on the embodiments of the present invention without creative labor shall fall within the scope of protection of the invention.

The terms "the first," "the second" etc. used in the present invention are intended to differentiate objects rather than describe a specific sequence. Besides, the terms "include," "have" and any of their variants are intended to cover non-exclusive inclusions. For example, a process, method, system, product or device that contains a series of steps or units is not limited to including the listed steps or units but may optionally include steps or units not listed, or optionally other steps or units that are inherent to such process, method, system, product or device.

The reference to "embodiments" herein means that the specific characteristics, structures or features may be contained in at least on embodiment of the present invention. The phrase occurring in various positions of the specification does not necessarily mean the same embodiment, nor is it an independent or alternative embodiment that is mutually exclusive with other embodiments. Those skilled in the art should understand explicitly or implicitly that the embodiments described herein can be combined with other embodiments.

Please refer to FIGS. 1-5. An embodiment of the present invention provides a car running board 10, and said running board 10 comprises a first running board body 11, a second running board body 12 and at least one car installation support 13; the first running board body 11 is telescopically connected with the second running board body 12; the car installation support 13 is rigidly connected with the first running board body 11 and/or the second running board body 12 on one end and with the car on the other end.

Wherein, said first step 11 and said second step 12 are the stepping function area of car running board, which carry the people getting in or off the car and are also the main appearance embodiment of the product, said first step 11 and said second step 12 can be molded by metal plate and coated with anti-corrosion powder to form a corrosion resistant layer so as to prolong the service life of the running board body.

In a specific embodiment, said first running board body 11 and said second running board body 12 are provided with corresponding limiting devices for restricting the first running board body 11 and said second running board body 12 at the preset stretching and contracting positions.

Figure 2:
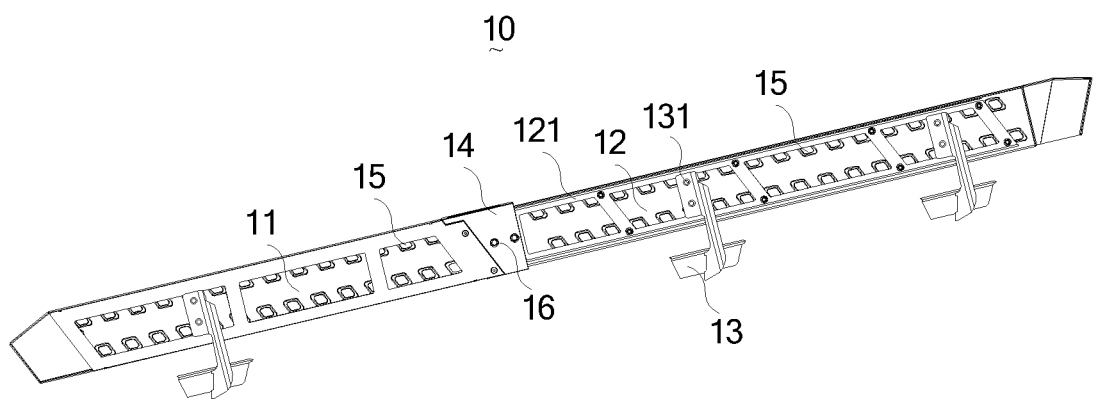
FIG. 2 is the schematic diagram of the back structure in expanded state of the car running board shown in FIG. 1.
Figure 3:
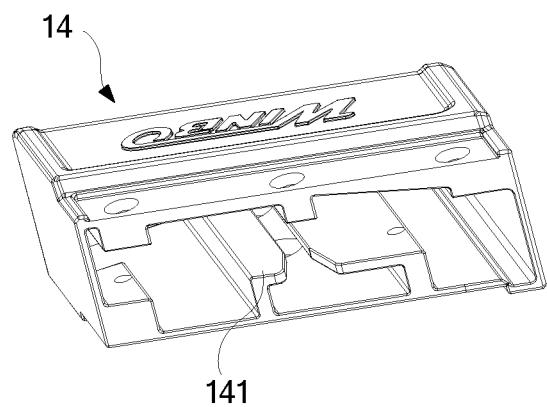
FIG. 3 is the schematic diagram of local enlarged structure of the middle connector of the car running board shown in FIG. 1.

In this embodiment, said first running board body 11 and said second running board body 12 are connected telescopically by a middle connector 14, wherein said middle connector 14 is fixedly connected with said first running board body 11, said middle connector 14 is provided with slide guide 141, said second running board body 12 is provided with a sliding rail 121 matching with said slide guide 141, and thus, said first running board body 11 and said second running board body 12 are telescopically connected through said sliding rail 121 and said slide guide 141 of said middle connector 14; said middle connector 14 and said second running board body 12 are provided with corresponding limiting devices 16 for restricting said first running board body 11 and said second body 12 at the preset stretching and contracting positions. For example, as illustrated in FIG. 2, screw holes are installed on the corresponding preset stretching and contracting positions of said middle connector 14 and said second running board body 12, and when said first running board body 11 and said second running board body 12 are stretched to the preset positions, limiting fixing can be achieved by installation screws, further realizing the rigid connection among said first running board body 11, middle connector 14 and said second running board body 12. In other embodiments, telescopic structures in mutual matched connection (such as mutually matching slide guide and slide rail) are set on said running board body 11 and said second running board body 12, respectively, thus realizing a telescopic connection between said running board body 11 and said second running board body 12.

In addition, said middle connector 14 can be provided with a surface anti-corrosion layer to prolong its service life.

In an embodiment, said first running board body 11 and said second running board body 12 are provided with antiskid structure 15 on surface. Optionally, the antiskid structure 15 can be of the hopper-shaped porous structure as illustrated in FIGS. 1 and 2. Such structure can, in addition to antiskid role, timely remove the sands splashed in car driving or dust falling on the running board body so as to prevent accumulative water and sludge. Or, the antiskid structure 15 can be coated by spraying sand stripe powder or paint with rough hand feel and increased friction, thus enabling antiskid function in the stepping area so as to improve safety. Or, in an embodiment, the antiskid structure 15 may adopt a combination of hopper-shaped porous structure with surface coating.

In this embodiment, the number of installation supports 13 is 3. In other embodiments, the number of installation supports 13 may be set in light of specific condition, such as 1, 2, 4 or 5. Besides, to ensure uniform stress, the installation supports can be uniformly set on the installation sides of said running board body 11 and said second running board body 12. Of course, said installation support 13 can be only fixedly connected with said running board body 11 or said second running board body 12 to make the running board connect with the car in a rigid and stable manner via said load support 13, thus ensuring the safety of stepping by passengers.

Figure 4:
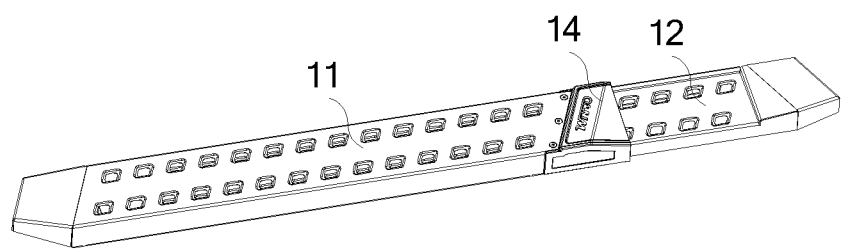
FIG. 4 is the structural diagram of the car running board shown in FIG. 2 after the installation supports are removed.
Figure 5:
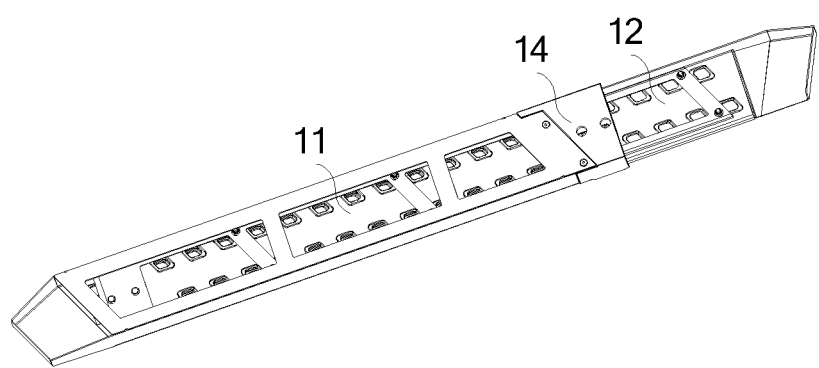
FIG. 5 is the structural diagram of the car running board in folded state as shown in FIG. 4 after the installation supports are removed.

Optionally, installation support 13 may be formed by metal and welding, and provided with surface anti-corrosion layer so as to prolong its service life. Moreover, as illustrated in FIGS. 2, 4 and 5, installation support 13 can be connected with running board body in a removable manner via installation screw 131. When in use, fix connection is made via installation screw 131 and when not in use, it can be removed so as to reduce volume and save storage space.

In the above embodiments of car running board 10, said first running board body 11 and said second running board body 12 are telescopically connected. When the running board 10 is not used on the car, it can contract to reduce volume, thus saving transport cost and storage space; if it is necessary to be installed on the car for use, it can be spread into a regular step shape, which can assist driver and passenger in getting in or off the car and meanwhile, protect the car side.

In addition, the present invention also provides a car comprising the car running boards in any of the above embodiments, wherein the running boards are installed on the car in a fixed manner through installing supports to assist driver and passenger in getting in or off the car. Besides, the best installation positions of car running boards are acquired by repeated measurements, calculations and verification of the stepping position (including the distance above ground and the distance away from the car body) so as to provide a most comfortable stepping positions for passengers.

The above embodiments of the present invention are only for description and shall not restrict the patent scope of the present invention. All equivalent structures or equivalent process transformations based on the specification and drawings of the present invention, or direct or indirect applications thereof in other relevant technical fields shall be similarly covered by the patent protection scope of the present invention.

The invention claimed is:

1. A car running board comprising:
 a first running board body;
 a second running board body;
 at least one car installation support, wherein the first running board body is flexibly connected with the second running board body, and the car installation support is rigidly connected with the first running board body and/or the second running board body on one end and with a car on the other end;
 a middle connector telescopically connecting the first and the second running board bodies for adjusting the first and second running board bodies prior to installing;
 wherein the middle connector with the first and the second running board bodies are fixedly connected on the car in a rigid and stable manner through the at least one car installation support to assist driver and passenger safety in getting in or off the car;
 wherein, said middle connector is fixedly connected with said first running board body, said middle connector is provided with a slide guide, said second running board body is provided with a sliding rail matching with said slide guide, and thus said first running board body and said second running board body are telescopically connected through said sliding rail and said slide guide of said middle connector; and
 said middle connector and said second running board body are provided with corresponding limiting devices for restricting said first running board body and said second body at the preset stretching and contracting positions.

2. The car running board according to claim 1, wherein said first running board body and said second running board body are provided with corresponding limiting devices for restricting them at the preset stretching and contracting positions.

3. The car running board according to claim 2, wherein the surfaces of said first running board body, said second running board body, installation supports and middle connector are all provided with a corrosion resistant layer.

4. The car running board according to claim 1, wherein said first running board body and said second running board body are provided with an antiskid structure on the surface.

5. The car running board according to claim 4, wherein said antiskid structure includes a funnel-shaped porous structure.

6. The car running board according to claim 5, wherein said antiskid structure also includes antiskid coating.

7. The car running board according to claim 1, wherein a number of said at least one car installation support is 4 and the 4 supports are uniformly distributed on the installation side edge of said first running board body and said second running board body.

8. The car running board according to claim 7, wherein said installation supports are metal molded and welded.

9. A type of car, comprising the car running board according to claim 1.

* * * * *